REAL TIME CONTOUR PLOTTER

Filed Dec. 27, 1967 4 Sheets-Sheet 1

INVENTOR.
JAMES M. KASSON
BY Townsend and Townsend
ATTORNEYS

INVENTOR.
JAMES M. KASSON

BY Townsend and Townsend

ATTORNEYS

INVENTOR.
JAMES M. KASSON
BY Townsend and Townsend
ATTORNEYS

REAL TIME CONTOUR PLOTTER

Filed Dec. 27, 1967 4 Sheets-Sheet 4

INVENTOR.
JAMES M. KASSON
BY Townsend and Townsend
ATTORNEYS 3,541,537

REAL TIME CONTOUR PLOTTER

James M. Kasson, Palo Alto, Calif., assignor to Santa Rita Technology, Inc., Menlo Park, Calif.

Filed Dec. 27, 1967, Ser. No. 693,895
Int. Cl. G08c *13/02*
U.S. Cl. 340—179 8 Claims

ABSTRACT OF THE DISCLOSURE

A real time contour plotter is described wherein a waveform is established such as by utilizing a commutator for successively sampling the output electrical signals from a number of sensors whose output signals are analogs of measures which vary with time, and a display is made whenever the waveform crosses any of a desired number of contour levels. In using the commutator, interpolation of the commutator output signal between portions thereof representative of successive sensors sampled can be accomplished by taking a difference and integrating; integration is effected by operating at 100% duty cycle and using a low-pass filter, or by averaging adjacent portions of the signal utilizing delay lines, sample and hold circuits, or a digitized output then passed through a digital interpolator.

BACKGROUND OF THE INVENTION

Field of the invention

This invention relates to a real time contour plotter for providing an immediate display by reference to contours of equal amplitude of signals spatially related and changing in time. It is often desired to present the information residing in a number of signals, usually spatially related and changing in time such as the signals from sensor arrays and converter-conditioners such as those sampling temperature, pressure, voltage current and the like, in a manner which is meaningful to a common observer. If the relationship between the various signals is sufficiently close, a plot of contours of equal amplitude is quite useful for visual interpretation.

DESCRIPTION OF THE PRIOR ART

An example of the type of signal for which a contour plot is applicable is a multiband spectrum analyzer which is excited by a waveform which is to be analyzed. A previous technique for obtaining a contour plot of this information has been to record a sample of the waveform to be analyzed, than to set a tunable filter to a frequency at one end of the region of concern. The sample is then played through the filter, and marks are placed upon the output recording medium whenever the detected output of the filter crosses any one of a family of levels. After one complete pass of the sample, the center frequency of the filter is changed slightly, and the process is repeated until the entire frequency range of interest has been covered. There are several disadvantages to this method:

(1) Although the sample is usually played back at several times the rate at which it was recorded, it usually takes many times longer to make the contour plot than it took to record the sample.

(2) The sample must be recorded before analysis can proceed.

(3) The application of such contour plotting to other types of information, such as strain gauge or thermal data, is not simple, as the gauge or sensor in question must be moved.

SUMMARY OF THE INVENTION

The object of the present invention is to provide a real time contour plotter for appropriate display in contours instant-by-instant of the variable being measured, such as frequency, by time.

Broadly stated the present invention, to be described in greater detail below, is directed to a real time contour plotting apparatus and method wherein a plurality of output electrical signals, such as analogs of certain measures that vary with time, are simultaneously produced, such as with a plurality of detectors, and successively sampled, such as by a commutator, to produce a sampled signal, and a contour plot is formed by recording or displaying whenever the sampled signal crosses any of a desired number of contour levels.

The detectors can be in the form of a sensor bank, be it a set of fixed filters, a row of strain gauges, a group of thermal sensors, or some other sensible array of metering devices, and the output of the sensor bank is converted into electrical information. Most sensors incorporate this conversion property within their design; examples include detectors and low-pass filters for the case of a filter bank, or a current source for the case of resistance-type strain gauges.

The waveform or sampled signal can be produced using a commutator of a type presently known for sampling electrical signals or such as the one described in applicant's copending application entitled "Electronic Commutator," Ser. No. 633,233, filed Apr. 24, 1967.

If the number of channels in the sensor bank is small and if interpolation between the various outputs is meaningful, interpolation between successive portions of the commutator output signal can be accomplished in accordance with one of the methods set forth in greater detail below.

The output of the interpolator, when it is used, or the output of the commutator, when the interpolator is not used, is sensed and an output signal is directed to a display or recording medium whenever the output signal crosses any one of the desired levels or contours, whether the contour is crossed from above or below. The display recording medium will accept the output signal of the contour crossing sensor and other appropriate measures such as the position of the commutator along the sensor bank. This recording medium can be a camera phtographing an oscilloscope screen, or a more sophisticated recorder whose trace intensity may be modulated such as an ink-spray recorder, or a fiber optic cathode ray tube with a photosensitive material passing by the ends of the fiber optic network.

The method and apparatus in accordance with the present invention is fundamentally different from the swept filter system of the prior art. In accordance with the present invention, the entire filter bank is swept and the contours plotted instant-by-instant in frequency by time rather than in time by frequency. It is obvious that, if the commutator is fast enough, the present method and apparatus yield performance in real time without the necessity for a recording of the input data, or waiting until the variable frequency filter has been swept over the range of interest. With this invention, any collection of spatial or conceptually related inputs may be used.

The interpolation referred to above can be accomplished in a number of ways with the present invention. In accordance with one aspect of the present invention, the interpolator includes means for determining the difference between adjacent portions of the commutator output signal as are representative of electrical signals of successive detecting means sampled, and means for integrating and applying this difference to the contour sensing apparatus between such adjacent portions of the commutator output signal.

In accordance with another aspect of the present invention, the interpolator includes a low-pass filter and means for passing the commutator output signal through the low-pass filter.

In accordance with still another aspect of the present invention, the interpolator includes means for obtaining an average signal of successive portions of the commutator output signal and means for passing this average signal to the contour crossing sensor between application of successive portions of the commutator output signal to the contour crossing sensor.

In one aspect of this invention the average signal is achieved utilizing a pair of delay lines for receiving the output of the commutator, each delay line providing a delay of one half of the sampling rate of the commutator with means for combining the outputs of these delay lines. In another aspect of this invention, this average signal is achieved utilizing at least a pair of sample and hold circuits with means for alternately connecting these circuits to the commutator. The average signal can also be achieved by converting to digital information and then averaging.

One particular application of the present invention is in conjunction with an analog ear for speech analysis, machine recognition of speech, bandwidth compression, diagnostics, speech training and interpretation of auditory phenomena in animals other than man. For example, this invention may be employed in the observation of analog cochlea excitations as a function of position along the basilar membrane, then constituting the commutator mentioned in U.S. Pat. No. 3,294,909, issued Dec. 27, 1966 for "Electronic Analog Ear."

Certain characteristics of an analog ear analyzer make it roughly similar to a spectrum analyzer. With the analog ear and the present invention real time contour cochleograms or sound prints can be produced.

Other objects, features and advantages of the present invention will become apparent upon reading the following specification and referring to the accompanying drawings in which similar characteristics of reference represent corresponding parts in each of the several views.

In the drawings:

FIG. 1 is a schematic block diagram view illustrating the present invention;

FIGS. 2*a* and 2*b* are contour plots utilizing the present invention;

FIG. 3*a* is a schematic diagram illustrating one interpolator embodiment of the present invention, and FIGS. 3*b* and 3c are circuit drawings illustrating aspects of such an interpolator;

FIGS. 4*a* and 4*b* are respectively a schematic circuit diagram and a series of waveforms illustrating another interpolator embodiment of the present invention;

FIGS. 5*a* and 5*b* are respectively a circuit diagram and waveform diagram illustrating another interpolator embodiment of the present invention;

Figure 1:
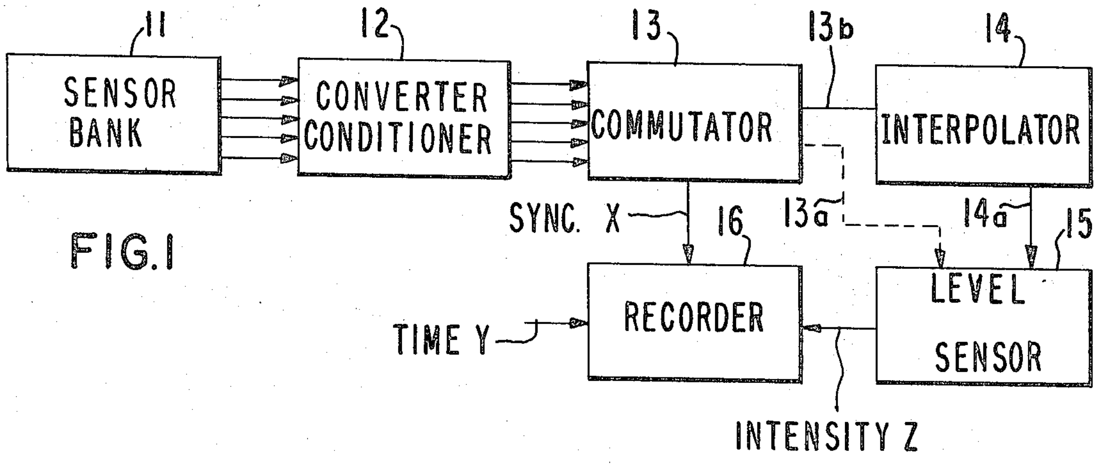

Referring now to the drawing there is shown one embodiment of the present invention. As schematically illustrated in block diagram form in FIG. 1, the present invention includes provision for a plurality of sensors designated as a sensor bank 11 for measuring a factor that varies with time such as a set of fixed filters, a row of strain gauges, a group of thermal sensors or the like. The output of each sensor of the sensor bank 11 is converted in a converter conditioner 12 into an electrical signal which is the analog of the particular measure varying with time. As mentioned above, most sensors incorporate this conversion property within their own design, and since the sensors and the converter conditioners themselves are not novel, no further detailed description will be made thereof.

The output from the converter conditioner 12 for each sensor of the sensor bank 11 is connected to a commutator 13 which functions to sample the output electrical signals such as the output voltages of the converter conditioner successively and to present these signals or voltages as a waveform in time rather than space at its output.

The pattern rate of the commutator 13 should be fast relative to the rates of change of the outputs of the converter conditioner 12. The output of the commutator 13 may have either a 100% duty cycle or a lower duty cycle depending upon the type of interpolator 14 to which the output of the commutator is connected. If no interpolator 14 is used, the output duty cycle of the commutator should be 100%; that is, it should step from one channel to the next without an intervening null time. Any appropriate electronic commutator can be utilized such as model 6401 manufactured by Santa Rita Technology, Inc., Menlo Park, Calif. and as described in copending application Ser. No. 633,233 for Electronic Commutator referred to above.

It is possible to obtain 100% duty cycle output which is much more noise free than the usual 100% duty cycle by the artifice of waiting until the switching transients are over, and then gating a fast sample and hold circuit ON for sampling the spike free date. In order to permit good operation at all stepping rates, techniques similar to those used in the 50% duty cycle commutator described in applicant's copending application Ser. No. 633,233, referred to above can be utilized.

The output **13*a* from the commutator 13 or the output 14*a* from the interpolator 14 where the number of channels in the sensor bank is small and interpolation between various outputs is meaningful is passed to a level sensor 15 wherein an output signal is directed to a display or recording medium schematically referred to as a recorder 16** whenever the commutator or interpolator signal crosses any one of the desired levels or contours, whether the contour is crossed from above or below.

Typically, the output of the level crossing sensor 15 is fed to the intensifying input to the recording instrument 16. If constant rate commutation is used, although not necessary to the plotting of contours by my method, the input to the recorder 16 may be a linear sawtooth synchronized in the commutator frames, such as that normally provided in a cathode ray oscilloscope. The *y* axis input to the recorder 16 should be a sweep, usually linear, in time. This can be accomplished by moving the recording medium such as photosensitive paper, past the recording head, such as a fiber optic cathode ray tube.

If the described apparatus is connected in the manner set forth above, a presentation will be obtained which plots contours of equal amplitude as a function of position along a sensor bank and time. Time may be a dummy variable by sweeping the sensors along a surface, and a topographic presentation of contours of constant amplitude as a function of position along two axes may be obtained.

Figure 2A:
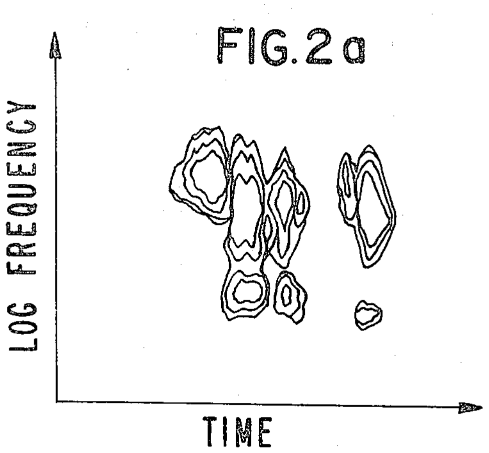
Figure 2B:
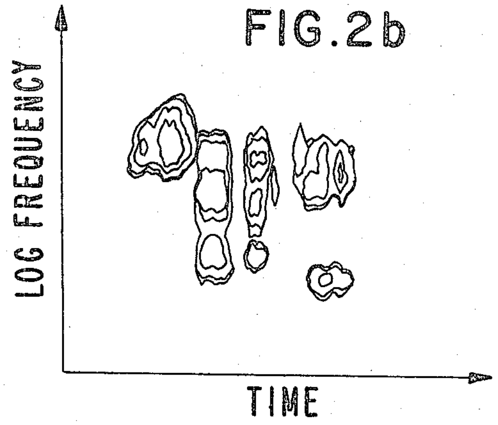

As previously mentioned, the present invention can be utilized in conjunction with an analog ear such as described in U.S. Pat. No. 3,294,909 for production or real time contour cochleograms. FIGS. 2*a* and 2*b* show cochleograms made of the word "Seventy" spoken by two different individuals and analyzed with a 16 section analog ear with half wave detectors and 30 Hz. low-pass Butterworth filters. In these figures, the distance representation is along the analog ear cochlea and the recorded contours are at 6 db intervals.

Figure 3B:
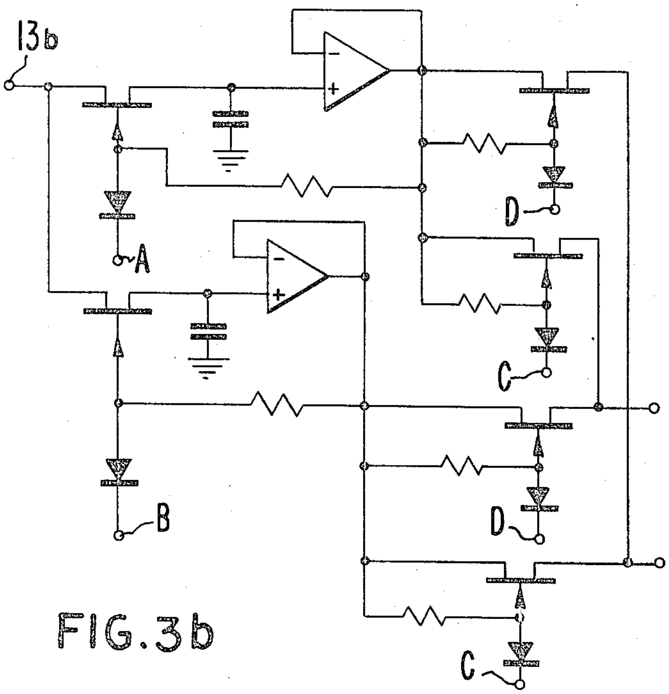
Figure 3A:
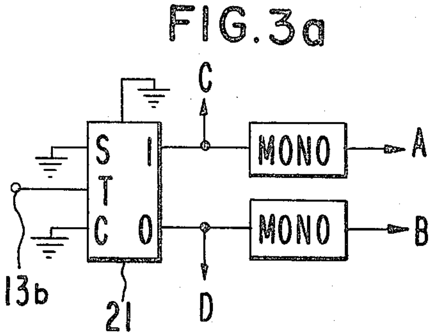
Figure 3C:
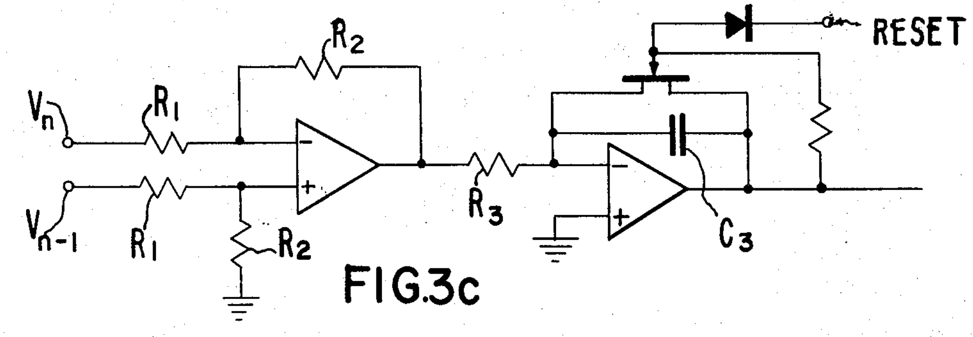

The interpolation apparatus and method can be accomplished in a number of ways in accordance with the present invention. One of the simplest methods and apparatus conceptually is that illustrated in FIG. 3. In this construction, schematically illustrated in FIG. 3*a* and detailed in FIGS. 3*b* and 3*c*, two sample and hold circuits 21 store the values of two consecutive sections. Analog switching is used so that one bus contains the sample voltage of the previous section. The difference of these two signals is taken, and this difference is integrated as illustrated in FIG. 3*c* so that the integrator will reach the final value in the stepping period. Thus, the integrating capacitor (C3) must be selected using the stepping rate and R3 as constraints. This apparatus and method provides linear interpolation between adjacent sections.

Another method for interpolating is to take a clean 100% duty cycle output and simply to pass this output through a low-pass filter. If the patterns under consideration are fairly smooth and the output is not noisy, this simple method will yield an acceptably smooth pattern without filtering out important information. A variation of this technique is to average adjacent sections and to low-pass filter the output. Principal methods of accomplishing this averaging will be described.

Figure 4A:
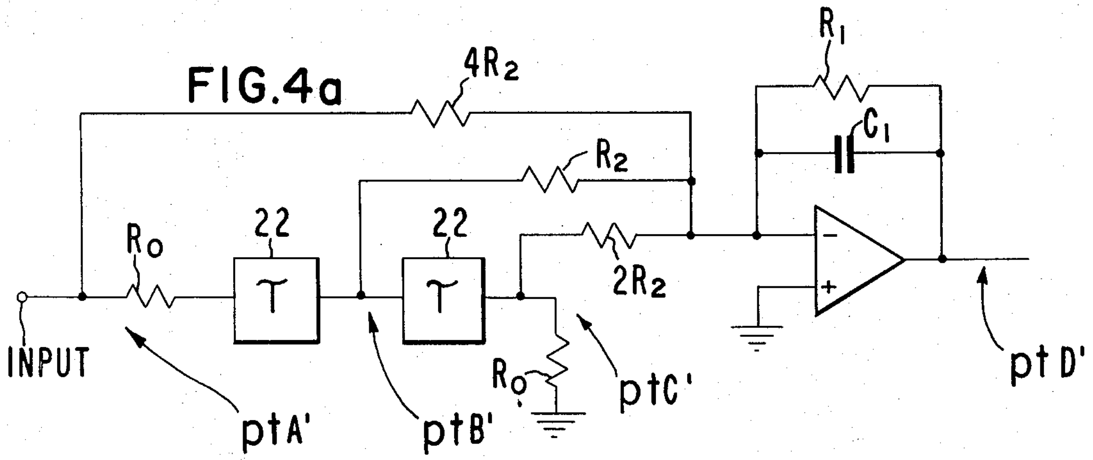
Figure 4B:
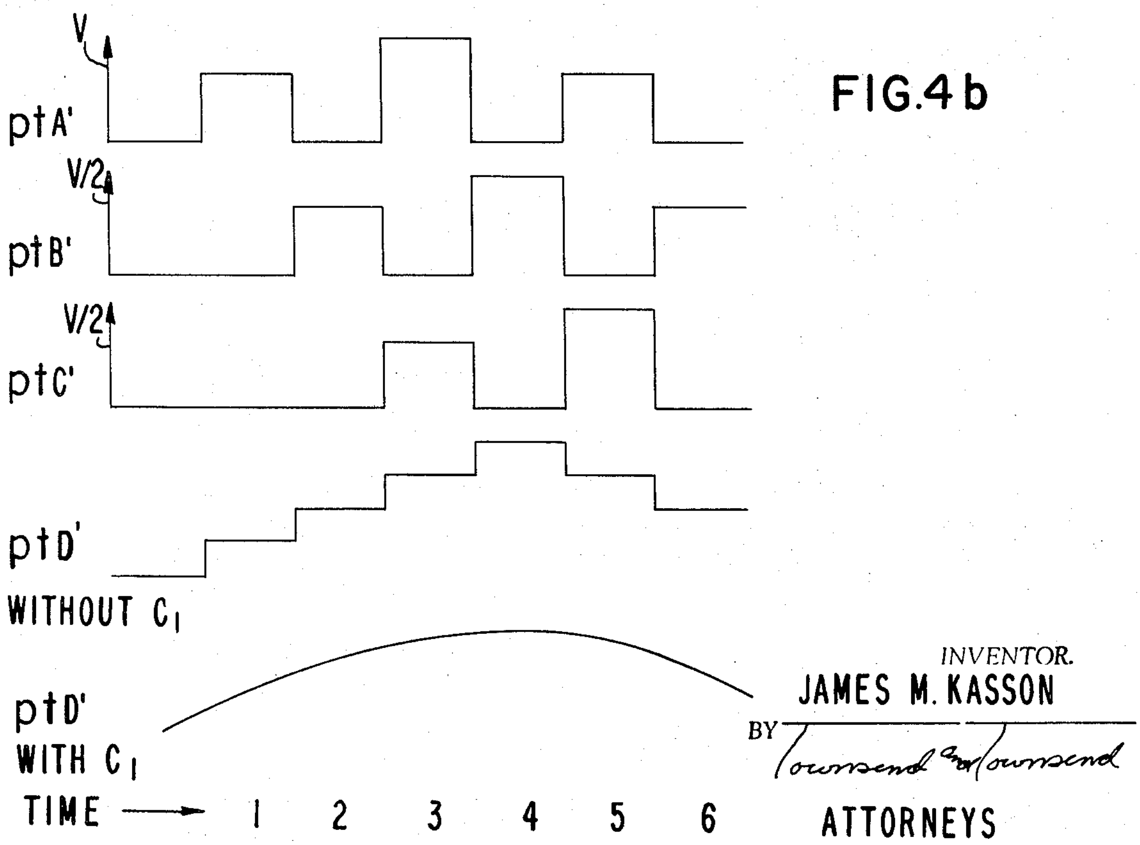

The first method involves the use of two delay lines of equal characteristics, or of a center tapped delay line. This technique is schematically illustrated in FIGS. 4*a* and 4*b*. The delay, $\tau$, of both sections 22 of the delay line should equal one-half the stepping rate. The delay line is fed from the 50% output of the commutator.

The waveforms shown in FIG. 4*b* illustrate how this method and apparatus perform averaging. The outputs from the delay lines are weighted and added to the weighted 50% output of the commutator. This weighting is performed in such a manner that the input and most delayed outputs have equal weights and the middle output has twice this weight. The fact that the resistor from the 50% output of the commutator is twice the value of the resistor from the most delay output is a consequence of the 6 db loss inherent in the series feed, shunt load method of matching the characteristic impedance of the delay line. If a delay line is reasonably well terminated at the load, it need not be matched at the source and hence a 6 db loss is not incurred. It can be seen by a perusal of the waveforms in FIG. 4*b* that this method yields voltages proportionally to the input voltages in time periods 2, 4 and 6 and voltages proportional to the average of the adjacent voltages in time periods 1, 3 and 5. Low-pass filtering may be included for further waveform smoothing. This filtering may take the form of an integrating capacitor, $C_1$ shown in the feedback loop in the circuit of FIG. 4*a* or low-pass filtering following the operational amplifier, or both. The delay line method may also be used to obtain averages over more sections, if desired.

Figures 5A, 5B, 6:
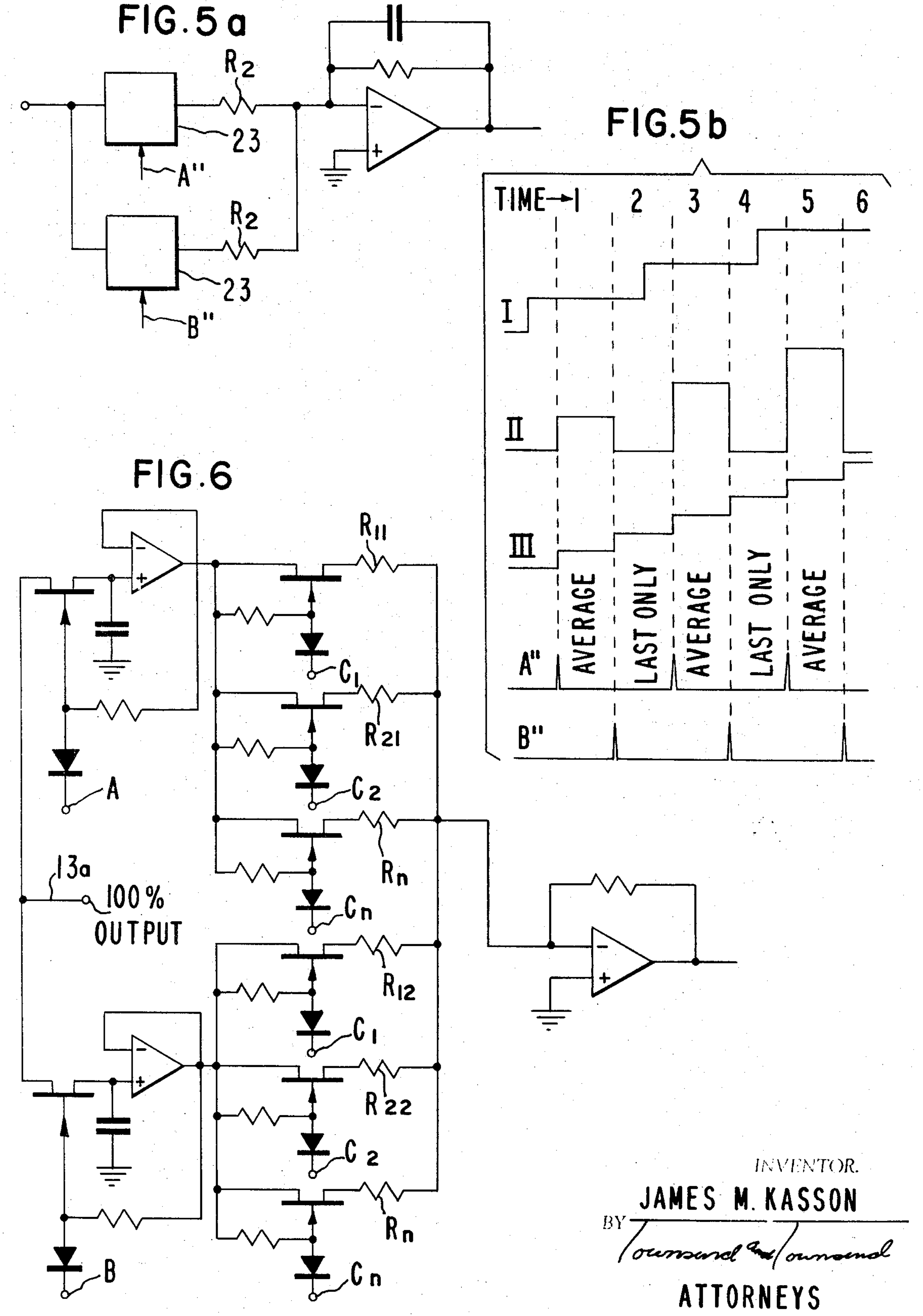
FIG. 6 is a circuit drawing of still another aspect of the present invention.

Another method for averaging sections is illustrated in FIGS. 5*a* and 5*b*. As shown there, two sample-and-hold circuits 23 are used. These circuits are triggered in such a manner that, alternately, one holds the last value and one holds the present value; and then they both hold the present value. The method for accomplishing this triggering is to first produce a waveform designated in FIG. 5*b* as II of twice the frequency of the stepping frequency designated I in FIG. 5*b*, and 90 degrees out of phase (90 stepping waveform degrees) with the stepping waveform I. A method of producing this waveform is detailed in patent application Ser. No. 633,233, dated Apr. 24, 1967 referred to above. This first produced waveform II is then fed into two monostable multivibrators, one of which is activated by the positive going portion of the waveform and one of which is activated by the negative going portion. The output of each multivibrator is then fed to the trigger gate of one of the sample and hold circuits. The output for both the sample and hold circuits is the 100% duty cycle of the commutator. The purpose of the 90 degree phase shift in the multivibrator driving waveform is to allow time for the switching transients in the 100% duty cycle output to decay before sampling that output. Outputs with less than 100% duty cycle can also be accommodated if they permit equally spaced sampling to occur. By adding more sample and hold circuits and by providing appreciable summing resistors and trigger waveforms averaging may be performed over more than two channels, or more steps of averaging over two channels, or both.

If only two channels are to be averaged, more steps can be generated by the circuitry illustrated in FIG. 6, which requires only two sample and hold circuits. In this circuit, the sample and hold circuits are gated so that they always store different information; that is, one always has the information on one channel, say channel *i*, and the other contains the data on the channel ahead of or behind channel *i*. The function of the analog gates after the sample and hold circuit is to permit changing the effective values of the summing resistors. Switching waveforms must be provided to the analog gates so that one in each bank is ON at any one time, and that a progression of ON gates is developed going from the top to the bottom of each bank, and back to the top. The summing resistors are chosen so that when one end of each is ON, all the voltage from one sample-and-hold circuit and none from the other is represented at the output. At the other end, the situation is reversed. The resistors in between are graded so that a weighting progression such as that shown in Table I (for an eight step average) is established.

| Time interval | Percent channel i | Percent channel i-l |
|---|---|---|
| 1 | 100 | 0 |
| 2 | 87.5 | 12.5 |
| 3 | 75 | 25 |
| 4 | 62.5 | 37.5 |
| 5 | 50 | 50 |
| 6 | 37.5 | 62.5 |
| 7 | 25 | 75 |
| 8 | 12.5 | 87.5 |
| 9 | 0 | 100 |

Figure 7:
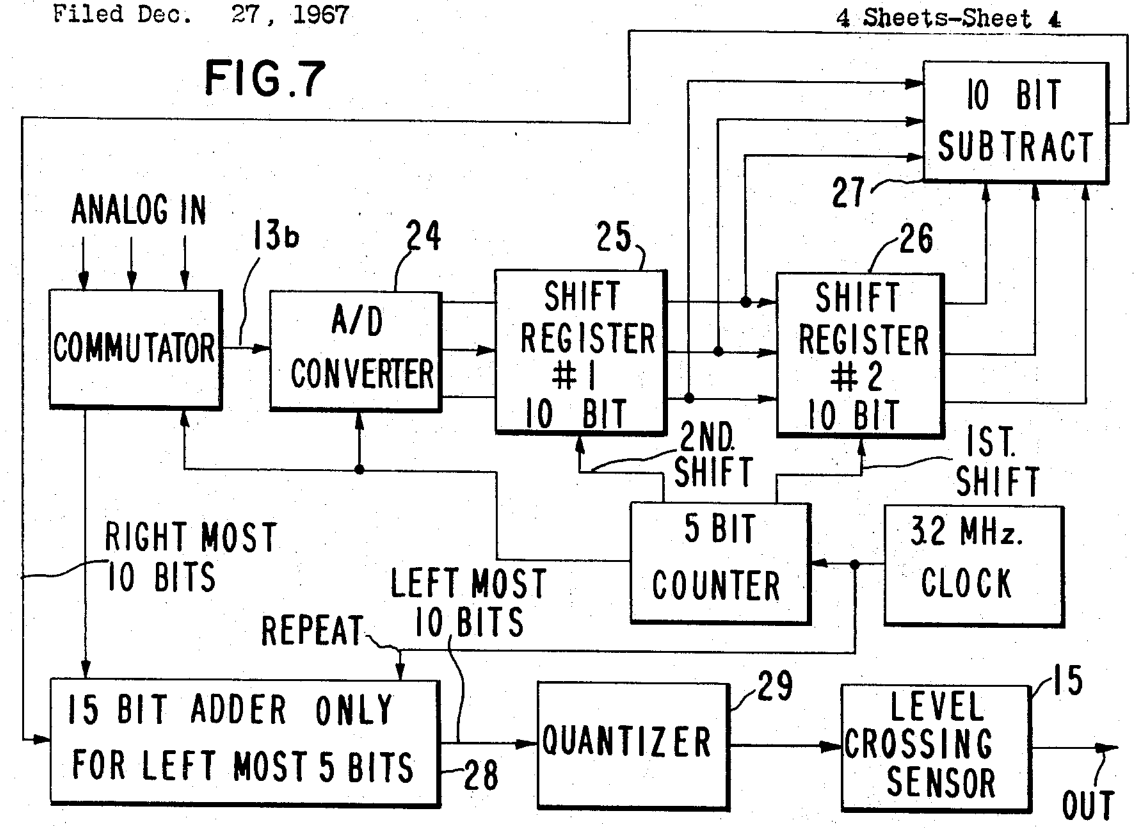
FIG. 7 is a schematic block diagram of another interpolator in accordance with the present invention.

Another way of accomplishing the effective interpolation is illustrated in FIG. 7 and includes provision for conversion of the output signal from the commutator to digital information in an analog to digital converter 24. The output of the converter 24 is directed to a first 10 bit shift register 25 the output of which is taken to a second 10 bit shift register 26 and to a 10 bit subtractor 27. The output from the subtractor 27 is connected to a 15 bit adder 28 and a quantizer 29 to the level crossing sensor 15. The quantizer is simple for 6 db increments since 6 db equals 1 bit. Therefore, a 10 bit unit will be able to handle 10 contours.

Figure 8:
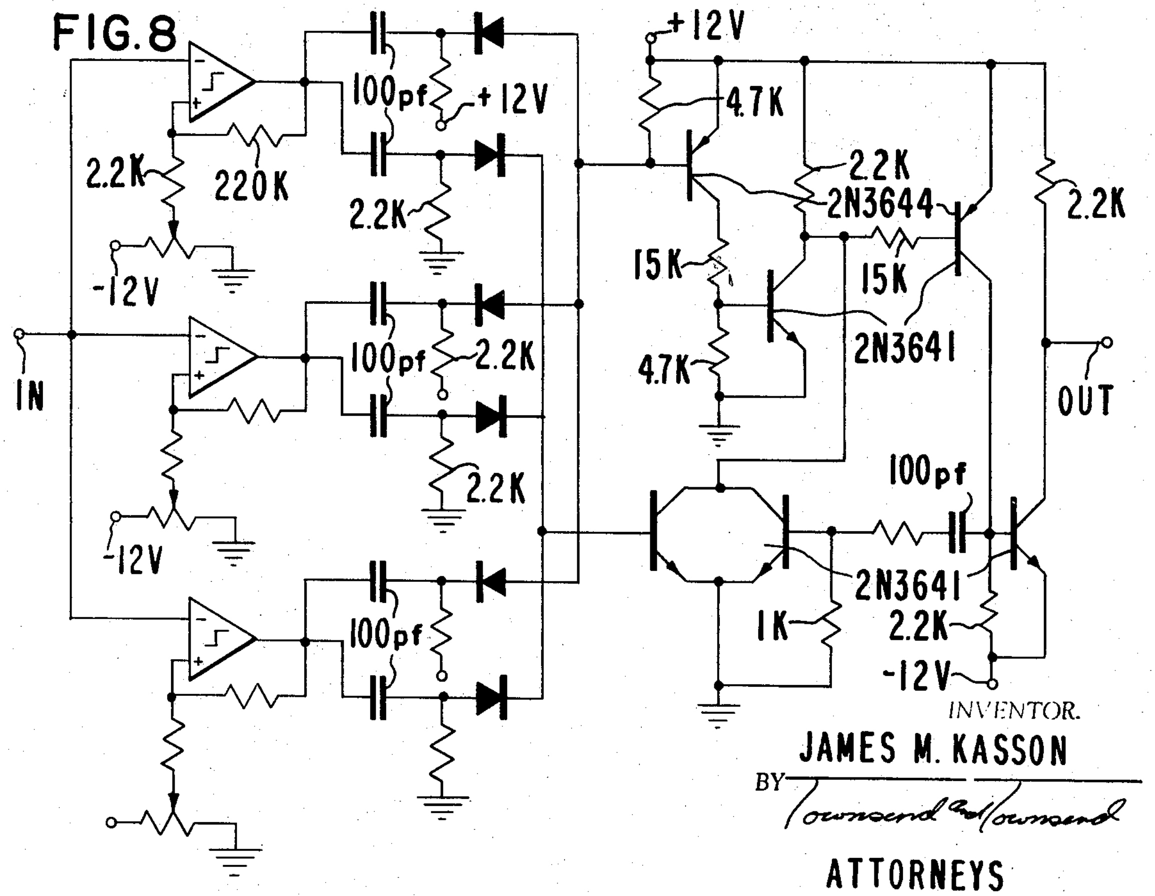
FIG. 8 is a circuit diagram illustrating a level crossing sensor useful in the present invention.

A schematic diagram of one possible level crossing sensor or detector 15 is given in FIG. 8. A row of comparators are fed at their inverting inputs with the signal under consideration, whether it be directly from the commutator 12 or the interpolator 14. The non-inverting inputs are connected to potentiometers which are set to the desired firing voltages. The positive feedback is optional; its effect is to introduce cleaner, faster switching at the expense of small hysteresis. It also prevents oscillations when the input remains near the firing voltage. The outputs of all the comparators are differentiated both positively and negatively, and summed, the positively differentiated row going to the positively triggered input of a monostable multivibrator and the negatively differentiated row going to the negatively triggered input of the monostable multivibrator. Thus, the multivibrator will be triggered whenever the input voltage crosses any of the preset trigger points whether it be from positive to negative or vice versa.

Although the foregoing invention has been described in some detail by way of illustration and example for purposes of clarity and understanding, it is understood that certain modifications can be practiced within the spirit of the invention as limited only by the scope of the appended claims.

What is claimed is:

1. A real time contour plotter comprising, in combination:

a plurality of detecting means, each for providing an output electrical signal as an analog of a measure that varies with time;

a commutator for successively sampling the output electrical signals of said plurality of detecting means and providing a commutator output signal;

means for interpolating said commutator output signal between portions thereof representative of the electrical signal of successive detecting means sampled;

means for sensing when the commutation output signal crosses any of a desired number of contour levels and providing an output signal when each of said levels is crossed; and means for recording the output of said level crossing sensing means.

2. The apparatus in accordance with claim 1 wherein said means for interpolation includes means for determining the difference between adjacent portions of said commutator output signal representative of the electrical signals of successive detecting means sampled; and means for integrating and applying said difference to said sensing means between said adjacent portions of said commutator output signal.

3. The apparatus of claim 1 wherein said means for interpolation includes a low-pass filter and means for passing the output signal from said commutator through said low-pass filter.

4. The apparatus in accordance with claim 1 wherein said means for interpolation includes means for obtaining an average signal of successive portions of said commutator output signal and means for passing said average signal to said sensing means between application of said successive portions of said commutator output signal to said sensing means.

5. The apparatus in accordance with claim 4 wherein said means for providing an average signal includes a pair of delay means connected to said commutator and each providing a delay of one half of the sampling rate of said commutator and means for combining the outputs of said delay means.

6. The apparatus in accordance with claim 4 wherein said means for producing said average signal includes at least a pair of sample and hold circuits, means for alternately connecting said circuits to said commutator and means for producing a signal from said circuits which is the average of successive portions of said commutator output signal.

7. The apparatus in accordance with claim 6 including a plurality of analog gates for producing a variable output signal weighted between the signal levels of said successive portions and applying said variable output signal to said sensing means between said successive portions of said commutator signal.

8. The method of producing a real time contour plot of the output of a plurality of sensors comprising the steps of simultaneously producing a plurality of output electrical signals as analogs of the signals sensed;

successively sampling said output electrical signals to produce a sample signal;

interpolating between successive portions of said sampled signal; and producing a recording when said sampled signal crosses any of a desired number of contour levels.

References Cited

UNITED STATES PATENTS 3,103,001 9/1963 Hage -------------- 340—179

DONALD J. YUSKO, Primary Examiner

C. MARMELSTEIN, Assistant Examiner

U.S. Cl. X.R.

340—182